(12) United States Patent
Belser

(10) Patent No.: US 6,421,313 B1
(45) Date of Patent: Jul. 16, 2002

(54) SYSTEM AND METHOD FOR ENCODING READ-ONLY INFORMATION ON STORAGE MEDIA

(75) Inventor: Karl A. Belser, San Jose, CA (US)

(73) Assignee: Seagate Technology LLC, Scotts Valley, CA (US); .

( * ) Notice: Subject to any disclaimer, the term of this patent is extended or adjusted under 35 U.S.C. 154(b) by 0 days.

(21) Appl. No.: 09/190,649

(22) Filed: Nov. 12, 1998

Related U.S. Application Data

(60) Provisional application No. 60/103,834, filed on Oct. 9, 1998.

(51) Int. Cl.⁷ .................................................. G11B 7/00
(52) U.S. Cl. ..................................... 369/100; 369/275.4
(58) Field of Search ........................... 369/275.3, 275.4, 369/44.26, 110.01, 110.02, 44.32, 47.17, 47.27, 47.25, 100

(56) References Cited

U.S. PATENT DOCUMENTS 6,118,752 A * 9/2000 Miyagawa et al. ...... 369/275.3

* cited by examiner

*Primary Examiner*—Paul W. Huber
(74) *Attorney, Agent, or Firm*—Simon & Koerner LLP; Nancy R. Simon; Gregory J. Koerner

(57) ABSTRACT

A system and method for encoding read-only information comprises a storage medium, a plurality of position marks disposed on the storage medium, and a light beam directed towards the position marks to produce a reflection of the light beam from the position marks. The position marks are configured such that the reflection of the light beam is not responsive to a plane of polarization of the light beam. In one embodiment, the position marks comprise rows of substantially circular pits. The dimensions of the substantially circular pits depend on a wavelength of the light beam and a numerical aperture of a lens that directs the light beam towards the position marks.

37 Claims, 8 Drawing Sheets

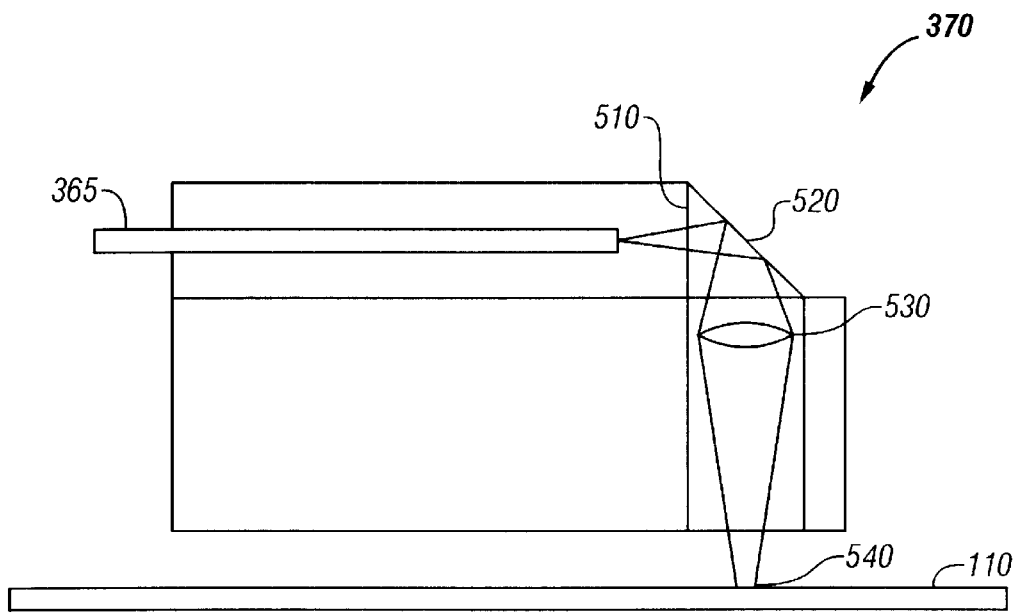
FIG. 5
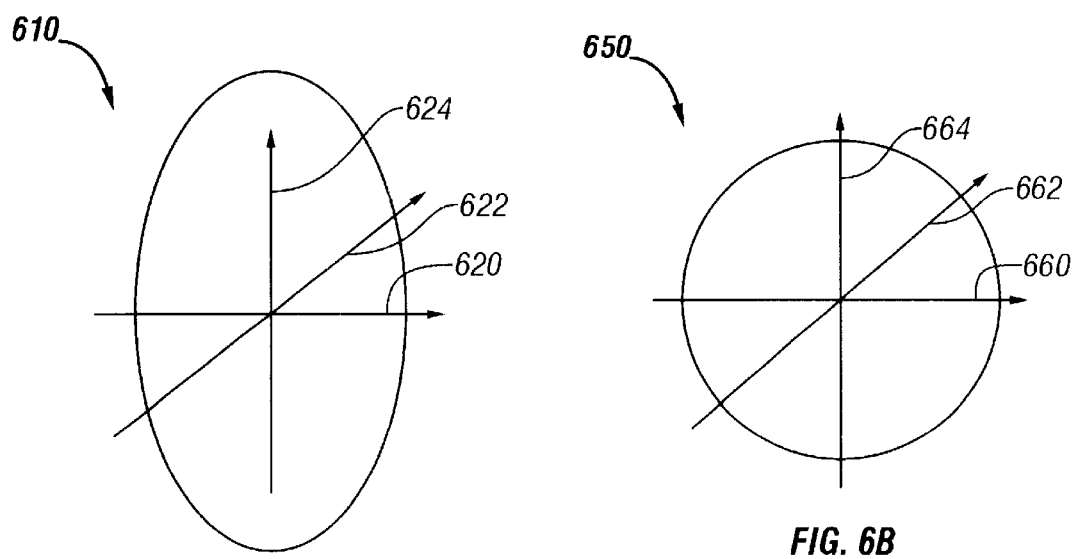
FIG. 6A
FIG. 6B

SYSTEM AND METHOD FOR ENCODING READ-ONLY INFORMATION ON STORAGE MEDIA

CROSS-REFERENCE TO RELATED APPLICATION

This application claims the benefit of Provisional Application Serial No. 60/103,834, entitled "Broken Gray Code Bars For Uniform ROM Signal Response With A Fiber Coupled Optical Head," filed Oct. 9, 1998. The subject matter of the related application is hereby incorporated by reference. The related applications are commonly assigned.

BACKGROUND OF THE INVENTION

1. Field of the Invention

This invention relates generally to encoding information, and relates more particularly to a system and method for encoding read-only information on storage media.

2. Description of the Background Art

Efficient, economic, and reliable storage of digital data is an important consideration of manufacturers, designers, and users of computing systems. In magneto-optical storage devices, digital data is typically stored in tracks located on rotating disks of magneto-optical (MO) storage media. Close positioning of the adjacent disk tracks maximizes the amount of stored data on a storage disk, thus providing significant economic benefits to system manufacturers and users. Therefore, system designers frequently seek new and improved methods of reducing track pitch to permit greater storage capacity on the storage media. As track pitch is reduced, differentiating between the tracks becomes of even greater importance for efficient and reliable storage of data.

Referring now to FIG. 1, a plan view of a front surface 112 of a magneto-optical storage medium 110 is shown. In MO storage devices, digital data is typically written into and read from a series of concentric or spiral tracks 114 located within a plurality of data sectors 177 on surface 112 of storage medium 110. The digital data is read from and written to surface 112 of storage medium 110 by projecting a laser-generated light spot from a magneto-optical head onto a selected track 114 while storage medium 110 is rotating, and then sensing the polarization of light reflected back from storage medium 110.

The head must be accurately positioned above track 114 of rotating storage medium 110 during a read/write operation on that track. Many factors, for example imperfections in track symmetry, may cause the head to be positioned slightly off the center of track 114. Positional correction of the head is therefore required for acceptable performance during a read/write operation.

One prior art position correction technique utilizes a diffraction pattern to generate a position error signal from grooves that are positioned between tracks on the storage medium. Another correction technique utilizes a plurality of servo sectors 178. Each servo sector 178 contains read-only information that indicates the position of the head on storage medium 110. This read-only information may be in the form of position marks permanently embossed on surface 112 of storage medium 110 at manufacture. The position marks may be used to generate a position signal, which may then provide feedback to compensate for position errors by adjusting the position of the head.

Referring now to FIG. 2(a), a diagram of position marks on sample storage media tracks within a servo sector 178 is shown. FIG. 2(a) includes sample tracks 0 through 4. Five tracks are presented for purposes of illustration, however storage medium 110 typically contains a significantly greater number of tracks. Furthermore, FIG. 2(a) depicts track 0 through track 4 as straight, whereas in practice they are typically circular.

As shown in FIG. 2(a), each track has three associated position marks which may be repeated at selected intervals along their corresponding track. The position marks are formed by depressions in surface 112 of storage medium 110. The ellipses shown in FIG. 2(a) represent the full-width-half-maximum dimensions of the depressions. The full-width-half-maximum dimensions of a depression are its dimensions at a plane located halfway between surface 112 and the bottom of the depression. When optical spot 220 (the full-width-half-maximum dimensions of the light spot from the head) travels over a position mark, the diffraction pattern is such that most of the light is not reflected back to the head. A resulting pulse occurs in a detected reflectivity signal that is based on the amount of light reflected back from storage medium 110 to the head.

Referring now to FIG. 2(b), a drawing of a reflectivity waveform corresponding to position marks 210, 212, and 214 is shown. During a read/write operation on track 4, the head is positioned over track 4 as storage medium 110 rotates at a selected rate of speed. The head initially encounters position mark 210, which is a radial bar created by overlapping elliptical depressions. When optical spot 220 passes over position mark 210, the amplitude of reflected light is reduced, generating negative-going sync pulse 230 at time 240. Ideally, a position mark would cause the reflectivity signal to fall to zero as optical spot 220 passes directly over the mark. In practice, position mark 210 is detected when the reflectivity signal becomes small, as represented by sync pulse 230.

Next, the head encounters position mark 212, which is positioned at a specified perpendicular distance off-center from track 4. Position mark 212 generates a negative-going pulse "A" at time 242. The amplitude of pulse A is relatively less than the amplitude of sync pulse 230 because optical spot 220 does not pass directly over position mark 212. Next, the head encounters position mark 214, which is positioned at the same specified distance off-center of track 4, but in the opposite direction of position mark 212. Position mark 214 generates a negative-going pulse "B" at time 244. The amplitude of pulse B is also relatively less than the amplitude of sync pulse 230. A radial position error signal (PES) for the head may then be obtained by taking the difference of the peak reflectivity amplitudes of pulse A and pulse B.

In some designs for MO storage devices, optical spot 220 has a linear plane of polarization with a direction that cannot be controlled. The amount of light reflected back to the head as the head passes over a position mark may be affected by the unpredictable direction of the plane of polarization of optical spot 220.

For example, optical spot 220 may have a plane of polarization that is parallel to position mark 210. A diffraction pattern created by optical spot 220 passing over position mark 210 may be such that a significant amount of light is reflected back to the head. A resulting pulse in the reflectivity signal may not be large enough to indicate the presence of a position mark.

Undetected position marks create errors in the read-only information being read from servo sectors 178. Errors in the read-only information read from servo sectors 178 cause the MO storage device to perform unreliably. Therefore, an improved system and method are needed to encode read-only information on storage media.

SUMMARY OF THE INVENTION

In accordance with the present invention, a system and method are disclosed to encode read-only information on storage media. One embodiment of the present invention is implemented in the context of a magneto-optical storage device. In the magneto-optical storage device, read-only information is encoded in servo sectors on surfaces of magneto-optical storage media.

One embodiment of the present invention includes a magneto-optical storage medium, a plurality of position marks disposed on a surface of the storage medium, and a light beam directed towards the position marks to produce a reflection of the light beam from the storage medium. The light beam is preferably a single-frequency laser beam.

The position marks are configured whereby the reflection of the laser beam is not responsive to a plane of polarization of the laser beam. In one embodiment, the position marks comprise substantially circular pits. The reflection from each of the substantially circular pits is not affected by the direction of the plane of polarization. The dimensions of the substantially circular pits depend on a wavelength of the light beam and a numerical aperture of a lens that directs the light beam towards the position marks. Each of the substantially circular pits has a depth of approximately one-quarter of the wavelength of the light beam.

The substantially circular pits may be disposed on the surface of the storage medium in rows. The rows are configured such that a distance between centers of the substantially circular pits is equal to about. one-half the wavelength of the light beam divided by the numerical aperture of the lens. The reflection of the light beam as the beam moves along a row is approximately constant, even though the substantially circular pits do not overlap. Therefore, the present invention more efficiently and effectively encodes read-only information on storage media.

BRIEF DESCRIPTION OF THE DRAWINGS

FIG. 5 is a side view of one embodiment of the magneto-optical head of FIG. 3, according to the present invention;

FIG. 6(a) is a diagram of one embodiment of a position mark on a magneto-optical storage medium;

FIG. 6(b) is a diagram of one embodiment of a position mark on a magneto-optical storage medium, according to the present invention;

DETAILED DESCRIPTION OF THE PREFERRED EMBODIMENT

The present invention relates to an improvement in encoding read-only information on storage media. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention includes a system and method for encoding read-only information on storage media. The invention includes at least one storage medium, a plurality of position marks disposed on the storage medium, and a light beam directed towards the storage medium to produce a reflection of the light beam from the storage medium. The position marks are configured whereby the reflection of the light beam is not responsive to a plane of polarization of the light beam. In one embodiment, the position marks comprise rows of substantially circular pits. The dimensions of the substantially circular pits depend on a wavelength of the light beam and a numerical aperture of a lens that directs the light beam towards the position marks.

Figure 1:
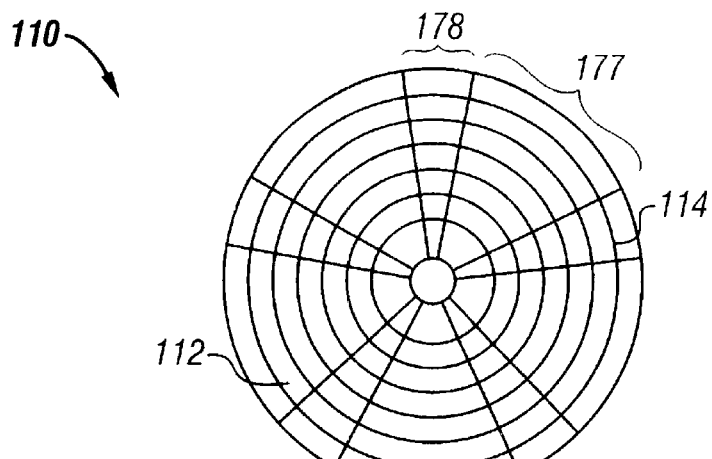
FIG. 1 is a plan view of a front surface of one embodiment of a magneto-optical storage medium, according to the present invention.
Figure 2A:
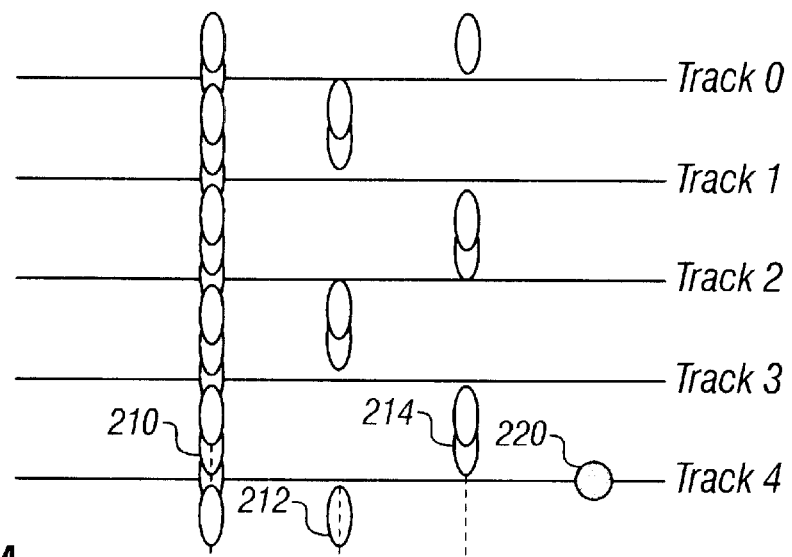
FIG. 2(a) is a diagram of position marks and a representative full-width-half-maximum diameter of an optical spot on a track of a storage medium.
Figure 2B:
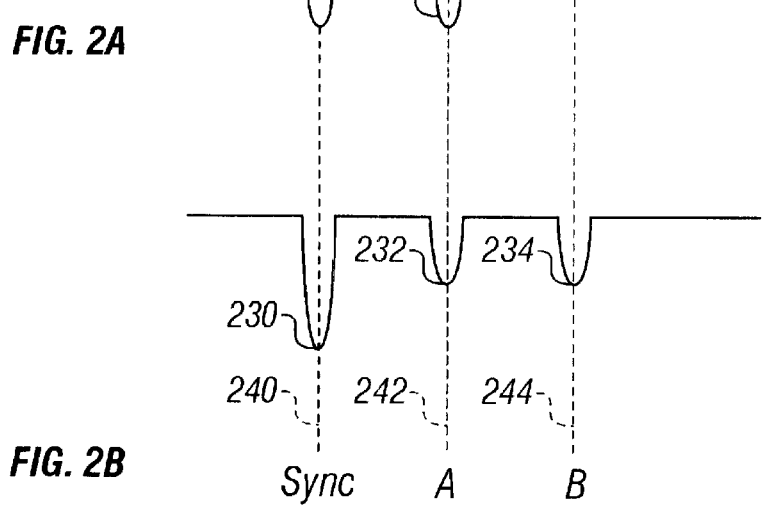
FIG. 2(b) is a drawing of a reflectivity waveform corresponding to the position marks of FIG. 2(a)
Figure 3:
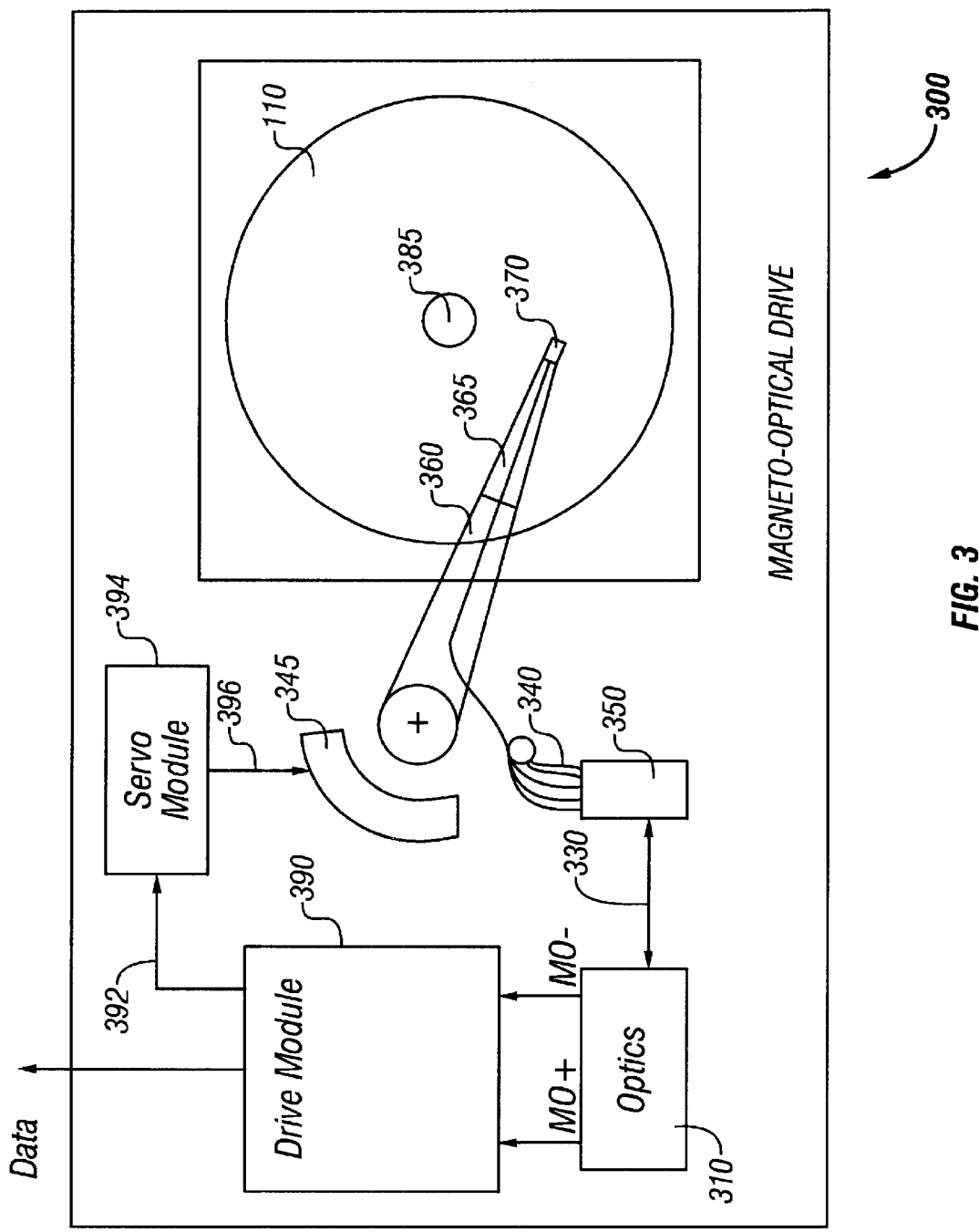
FIG. 3 is a pictorial view of one embodiment of a magneto-optical drive, according to the present invention.

Referring now to FIG. 3, a pictorial view of one embodiment of a magneto-optical drive 300 is shown, according to the present invention. Although a magneto-optical drive is discussed here, other types of storage devices, for example an optical drive, are within the scope of the present invention. In the FIG. 3 embodiment, magneto-optical drive 300 includes an optics assembly 310, an optical pathway 330, an optical switch 350, a fiber bundle 340, an actuator magnet and coil 345, a plurality of head arms 360, a plurality of magneto-optical heads 370, a plurality of magneto-optical storage media 110, a drive module 390, and a servo module 394.

Each of the plurality of magneto-optical storage media 110 are mounted on a spindle 385 for continuous rotation at a constant angular velocity and each of the plurality of magneto-optical heads 370 is preferably attached via a head arm 360 to electromagnetic actuator magnet and coil 345.

In the FIG. 3 embodiment, optical switch 350 receives light through optical pathway 330 and routes the light to one of a plurality of fibers in fiber bundle 340. The switching properties of optical switch 350 are bidirectional so that light reflected back to the switch 350 from storage media 110 along one of the fibers in fiber bundle 340 may also be routed to optical pathway 330. Each fiber of fiber bundle 340 is preferably routed along a respective head arm 360 to a respective magneto-optical head 370 and storage medium 110.

A reflected light signal from storage medium 110 couples back through magneto-optical head 370, one of the fibers in fiber bundle 340, optical switch 350, and reaches optics assembly 310 via optical pathway 330. Optics assembly 310 then converts the light signal to an electronic signal, which is then transmitted to drive module 390. Drive module 390 communicates the data represented by the electronic signal to a computer (not shown).

Figure 4:
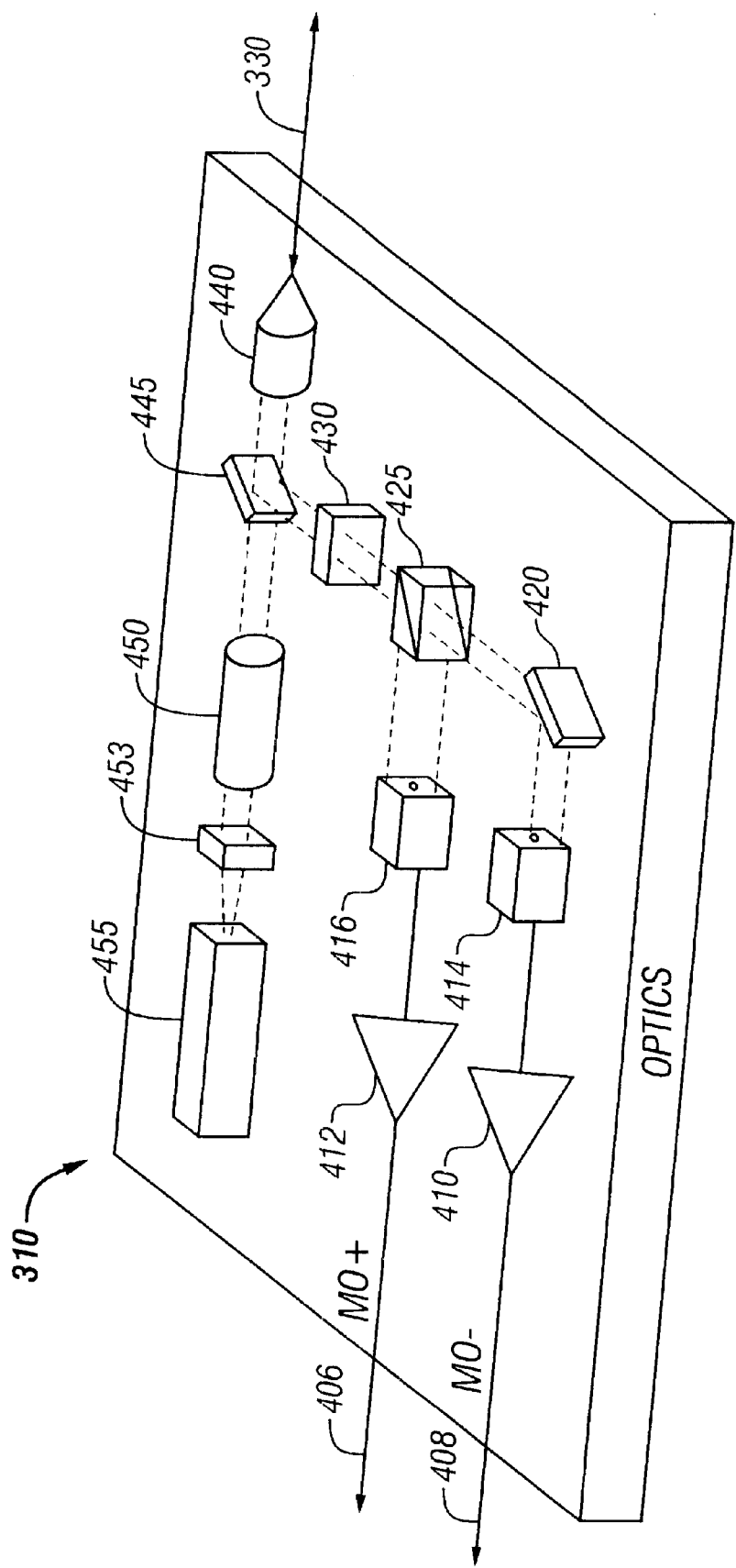
FIG. 4 is a schematic view of the optics assembly of FIG. 3, according to the present invention.

Referring now to FIG. 4, a schematic view of the optics assembly 310 of FIG. 3 is shown. In the preferred embodiment, optics assembly 310 includes a distributed feedback laser diode 455 polarized optical light source operating in the visible or near ultraviolet region, a leaky beam splitter (LBS) 445, collimating optics 450 and an optical. isolator 453 that are used before passing the laser light from laser diode 455 to leaky beam splitter 445, and a coupling lens 440 that is preferably a Gradient Refractive Index (GRIN) lens that focuses outgoing light from leaky beam splitter 445 into a Single-Mode Polarization Maintaining (SMPM) optical fiber 330 feed. Laser diode 455 generates a light beam having a single frequency and a circular or elliptical polarization state, however other polarized energy sources are within the scope of the present invention.

Referring now to FIG. 5, a side view of one embodiment of the magneto-optical head 370 of FIG. 3 is shown. Circularly or elliptically polarized light from switch 350 enters head 370 through a SMPM fiber 365. Inside head 370, the light leaves fiber 365 and passes through a quarter-wave plate 510. The now linearly polarized light is reflected from a mirror 520 to a lens 530. Lens 530 focuses the light on storage medium 110 as an optical spot 540.

Ideally, optical spot 540 has a plane of polarization derived from the polarization state of the light as it enters fiber 365 at switch 350. However, in actual MO storage devices, fiber 365 may experience thermal expansion. Thermal expansion of fiber 365 causes delay in the light signal, which changes the direction of the plane of polarization of optical spot 540. In other words, the direction of the plane of polarization of optical spot 540 cannot be predicted due to thermal expansion of fiber 365.

The plane of polarization of optical spot 540 generally has no effect on reading or writing magneto-optical data to storage medium 110. However, the plane of polarization of optical spot 540 may have an effect on reading information encoded in servo sectors 178 on storage medium 110. If the plane of polarization of optical spot 540 changes direction, it may cause errors in the reading of information encoded in servo sectors 178 on storage medium 110.

Referring now to FIG. 6(a), a diagram of one embodiment of a position mark 610 from a magneto-optical storage medium is shown. The direction of the plane of polarization of optical spot 540 may affect the detection of such a position mark embossed on storage medium 110 in servo sector 178.

Elliptical pit 610 represents the full-width-half-maximum (FWHM) dimensions of an elliptical depression embossed on surface 112 of storage medium 110. Since fiber 365 may experience thermal expansion, the plane of polarization of optical spot 540 may lie in almost any direction. Arrows 620, 622, and 624 represent possible directions of the plane of polarization of optical spot 540. For example, a plane of polarization 620 lies along the minor axis of elliptical pit 610. If optical spot 540 has plane of polarization 620 while passing over elliptical pit 610, the diffraction pattern typically is such that the amount of light reflected back to head 370 is small. This produces a pulse in the reflectivity signal that is typically large enough to indicate the presence of a position mark.

In another example, optical spot 540 may have a plane of polarization 624, which lies along the major axis of elliptical pit 610. If optical spot 540 has plane of polarization 624 while passing over elliptical pit 610, the diffraction pattern may be such that a significant amount of light is reflected back to head 370. The resulting pulse in the reflectivity waveform may not be large enough to indicate the presence of a position mark. Elliptical pit 610 may go undetected, causing an error in the information being read by head 370. Errors in reading the information contained in servo sector 178 cause MO drive 300 to perform unreliably.

Errors in reading information in servo sector 178 due to the direction of the plane of polarization of optical spot 540 are exacerbated when elliptical pits are embossed on storage medium 110 in an overlapping fashion. Such overlapping elliptical pits may in effect create a radial bar, or groove, that extends from an inner diameter to an outer diameter of storage medium 110. When the plane of polarization of optical spot 540 lies along the major axes of such elliptical pits, that is, along the radial groove, a significant amount of light may be reflected back to head 370. In some designs for storage medium 110, radial bars are used to identify the presence of servo sectors 178. If such a radial bar goes undetected, the corresponding servo sector may go undetected, making the performance of MO drive 300 unreliable.

Radial bars may also be used to encode addresses of tracks 114 in servo sector 178. If these radial bars go undetected, a track 114 may be misidentified, causing errors in the reading or writing of data on storage medium 110. These types of errors are unacceptable for reliable performance of MO drive 300.

Referring now to FIG. 6(b), a diagram of one embodiment of a position mark 650 from a magneto-optical storage medium is shown, according to the present invention. Circular pit 650 represents the FWHM dimensions of a circular depression embossed on surface 112 of storage medium 110. Since fiber 365 may experience thermal expansion, the plane of polarization of optical spot 540 may lie in almost any direction. Arrows 660, 662, and 664 represent possible directions of the plane of polarization of optical spot 540. For example, optical spot 540 may have a plane of polarization 660. If optical spot 540 has plane of polarization 660 while passing over circular pit 650, the diffraction pattern typically is such that the amount of light reflected back to head 370 is small. This produces a pulse in the reflectivity signal that is typically large enough to indicate the presence of a position mark. In other examples, optical spot 540 may have a plane of polarization 662 or 664. If optical spot 540 has either plane of polarization 662 or 664 while passing over circular pit 650, the diffraction pattern will be the same due to the symmetry of circular pit 650. The direction of the plane of polarization of optical spot 540 does not affect the amount of light reflected back to head 370 when a position mark comprises a circular pit. In other words, the reflection of the light from circular pit 650 is not responsive to the plane of polarization of optical spot 540. The system and method of the present invention advantageously utilizes this property to reduce or eliminate errors in reading information encoded on storage medium 110, and to increase the reliability of MO storage device 300.

Figure 7:
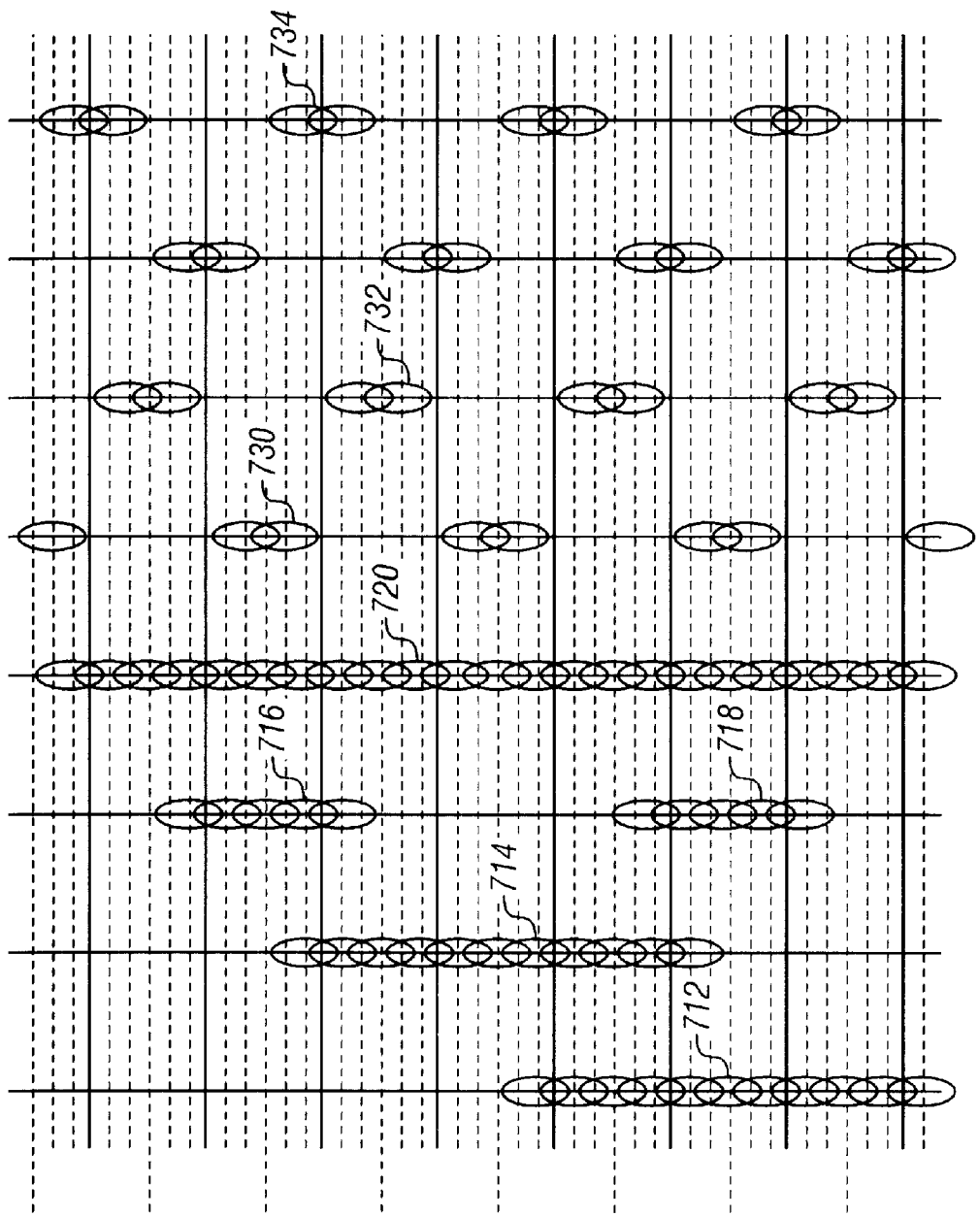
FIG. 7 is a diagram of one embodiment of a pattern of position marks on a magneto-optical storage medium.

Referring now to FIG. 7, a diagram of one embodiment of a pattern of position marks on a magneto-optical storage medium is shown. In the FIG. 7 embodiment, the position marks comprise elliptical pits. Radial bars 712–718 are created by overlapping elliptical pits, and are used to encode track addresses. Position marks 720, 730, 732, and 734 are also created by overlapping elliptical pits, and are used to generate position error signals.

Radial bar 714 is an example of the type of position mark the detection of which is most typically affected by the direction of the plane of polarization of optical spot 540. Radial bar 714, comprised of overlapping elliptical pits, is in effect a radial groove. If the direction of the plane of polarization of optical spot 540 lies along such a groove while passing over radial bar 714, the diffraction pattern may be such that a pulse in the reflectivity signal may not be large enough to indicate the presence of a position mark. If radial bar 714 goes undetected, an error in the track address occur, which in turn may cause errors in data being read from or written to storage medium 110.

Figure 8:
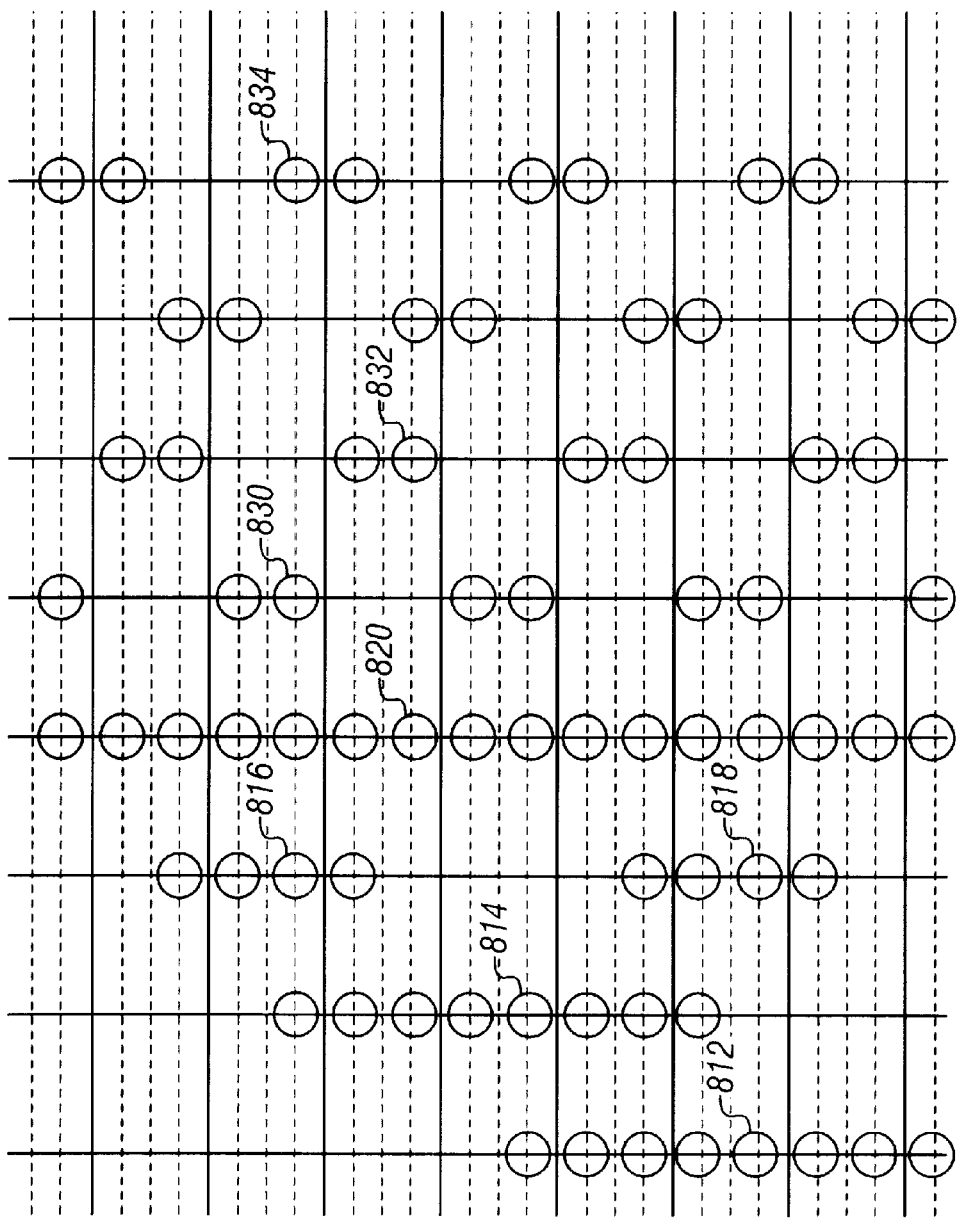
FIG. 8 is a diagram of one embodiment of a pattern of position marks on a magneto-optical storage medium, according to the present invention.

Referring now to FIG. 8, a diagram of one embodiment of a pattern of position marks on a magneto-optical storage medium is shown, according to the present invention. The pattern of position marks in FIG. 8 represents the same read-only information represented by the pattern of position marks shown in FIG. 7. In FIG. 8, the radial bars in FIG. 7 are replaced with rows of circular pits. The position marks used to generate position error signals are also comprised of circular pits. As discussed above in conjunction with FIG. 6(b), the direction of the plane of polarization of optical spot 540 does not affect the pulse in the reflectivity signal generated by such circular pits. Row 814 is comprised of circular pits that do not overlap. So unlike radial bar 714 (FIG. 7), row 814 is not in effect a radial groove. However, the circular pits of row 814 are dimensioned and spaced such that the reflectivity signal will be approximately constant as head 370 passes along row 814 in the radial direction. Thus row 814 acts like a radial bar, or groove, but without errors due to the direction of the plane of polarization of optical spot 540.

In the FIG. 8 pattern of position marks, the spacing of the circular pits in row 814 is related to the wavelength of the light used in MO storage device 300 and a numerical aperture of lens 530 in head 370. Optics assembly 310 (FIG. 3) generates a light signal with a single wavelength, $\lambda$. In the FIG. 3 embodiment $\lambda$ is preferably 660 nm. Lens 530 has a numerical aperture, NA. In the FIG. 5 embodiment of head 370, the NA of lens 530 is preferably 0.71. In the FIG. 8 pattern, a center to center distance between the circular pits is approximately 0.5 $\lambda$/NA, which is the optical cutoff frequency. In the FIG. 3 embodiment of MO drive 300, this distance is approximately 464 nm. MO drive 300 can tolerate some deviation, so the distance may vary, typically between 430 and 480 nm.

The depth of the circular pits in the FIG. 8 pattern also depends on the wavelength of the light. Each pit depth is preferably ¼$\lambda$. In the FIG. 8 embodiment each pit depth is approximately 165 nm. While the foregoing discussion focused on light having a single frequency, a MO drive using multiple frequency light is within the scope of the present invention.

It is to be recognized that the pattern of circular pits in FIG. 8 includes fewer depressions in surface 112 of storage medium 110 than the pattern of elliptical pits in FIG. 7. The FIG. 8 embodiment of the present invention allows the same read-only information to be encoded on storage medium 110 using a smaller number of depressions. The FIG. 8 pattern with its smaller number of depressions requires less time to be embossed on surface 112 of storage medium 110. Thus it is more efficient and economical to produce a storage medium with the pattern of circular pits of FIG. 8 instead of the pattern of elliptical pits of FIG. 7.

Figure 9A:
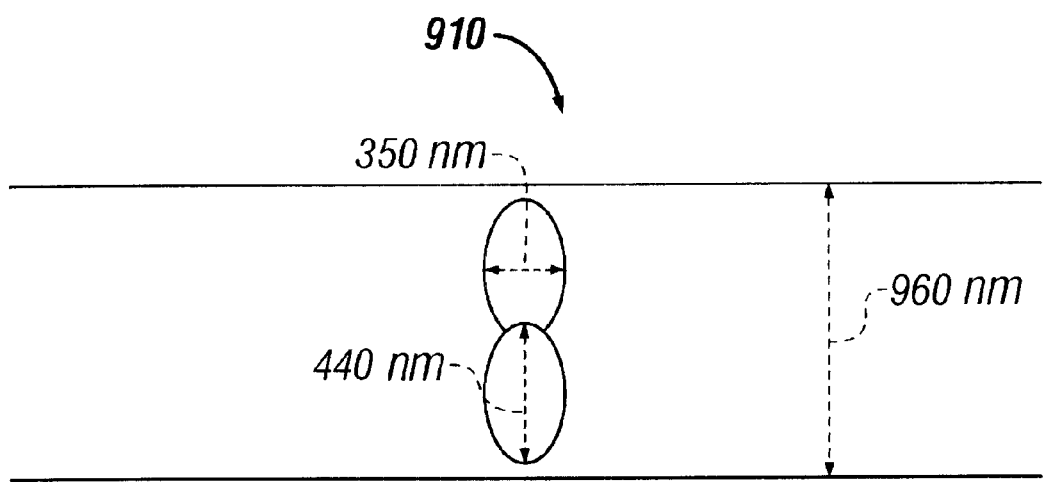
FIG. 9(a) is a diagram of dimensions of one embodiment of a position mark on a magneto-optical storage medium.

Referring now to FIG. 9(a), a diagram of dimensions for one embodiment of a position mark 910 on a magneto-optical storage medium is shown. The FIG. 9(a) embodiment of storage medium 110 has a distance between tracks, or a track pitch, of 960 nm. Position mark 910 comprises two overlapping elliptical pits. The elliptical pits in FIG. 9(a) represent the full-width-half-maximum (FWHM) dimensions of elliptical depressions embossed on surface 112 of storage medium 110. The FWHM is the effective size of the elliptical depressions. The FWHM minor axis of the elliptical pits measures 350 nm, and the FWHM major axis measures 440 nm. The elliptical pits overlap by a distance of approximately 80 nm. Thus, the effective length of position mark 910 is approximately 800 nm. If the direction of the plane of polarization of optical spot 540 lies along this effective length, position mark 910 may not be detected, as described above in conjunction with FIG. 6(a).

Figure 9B:
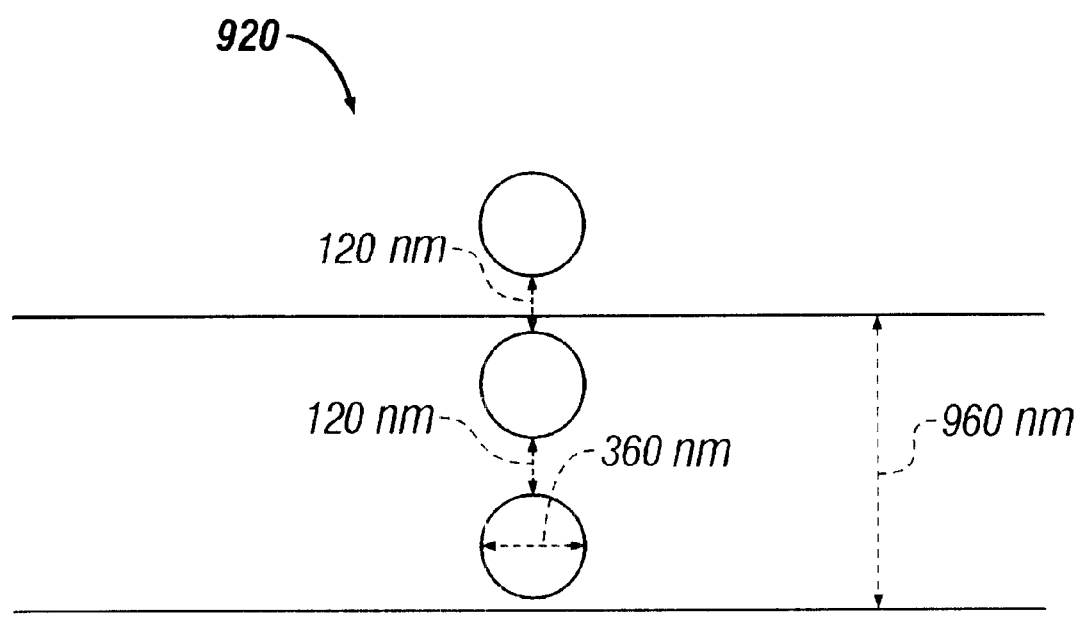
FIG. 9(b) is a diagram of dimensions of one embodiment of a position mark on a magneto-optical storage medium, according to the present invention.

Referring now to FIG. 9(b), a diagram of dimensions for one embodiment of a position mark 920 on a magneto-optical storage medium is shown, according to the present invention. The FIG. 9(b) embodiment of storage medium 110 has a track pitch of 960 nm, however other track pitches are within the scope of the present invention. The circular pits in FIG. 9(b) represent the full-width-half-maximum (FWHM) dimensions of circular depressions embossed on surface 112 of storage medium 110. The FWHM is the effective size of the circular depressions. In the FIG. 9(b) embodiment, the FWHM diameter of the circular pits is approximately 360 nm. For a row 920 having a center to center distance of about 480 nm, the distance between the FWHM diameters of the circular pits is approximately 120 nm.

The dimensions and spacing of the circular pits in row 920 are such that the reflectivity signal remains approximately constant as head 370 moves along row 920 in the radial direction. So even though the circular pits in row 920 do not overlap, head 370 perceives row 920 as an unbroken groove, but without errors due to the direction of the plane of polarization of optical spot 540. Thus the present invention efficiently and economically encodes read-only information on storage medium 110, increasing the reliability of MO drive 300.

Figure 10:
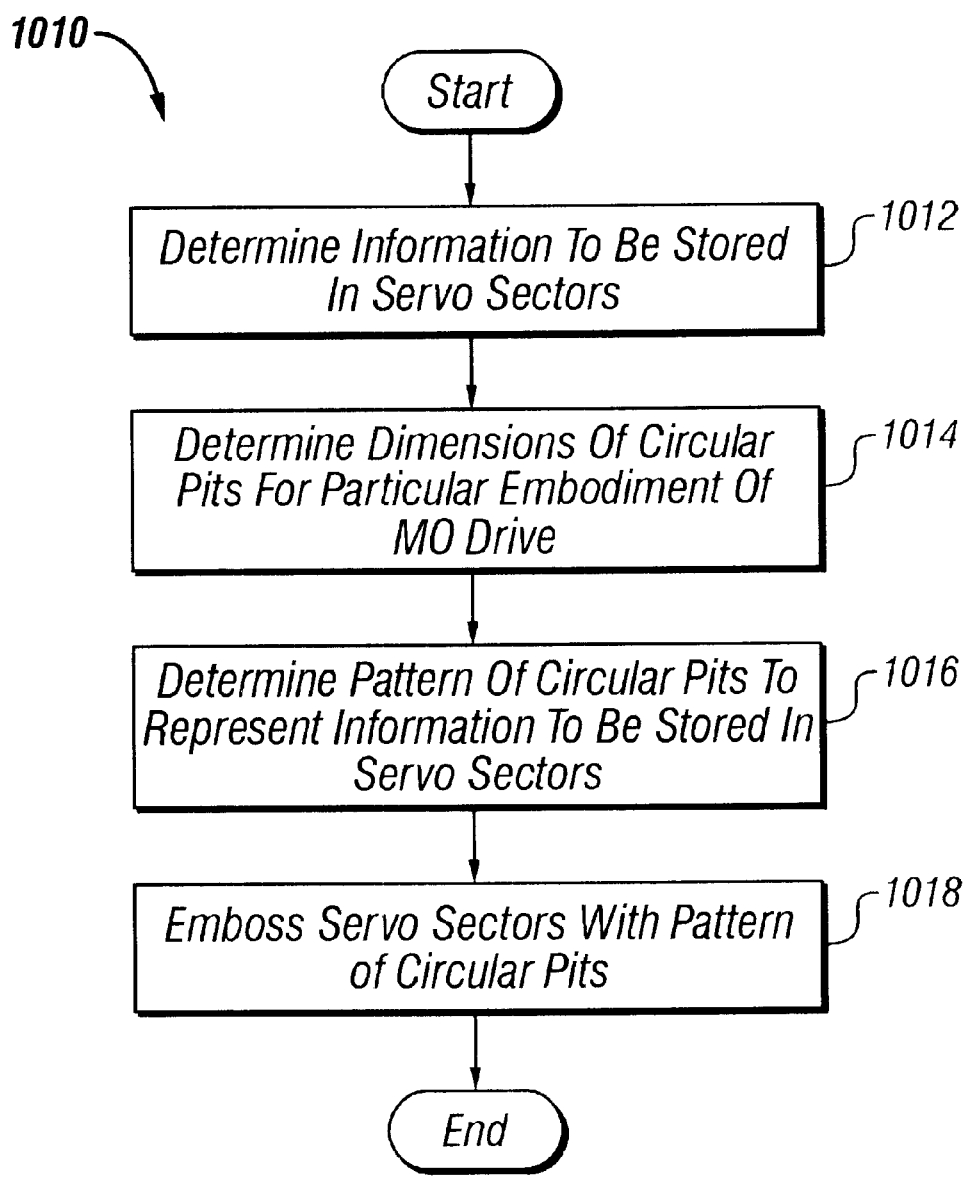
FIG. 10 is a flowchart of one embodiment of method steps to encode read-only information on storage media, according to the present invention.

Referring now to FIG. 10, a flowchart of one embodiment of method steps 1010 to encode read-only information on storage media is shown, according to the present invention. In step 1012, a manufacturer or designer of MO drive 300 determines the information to be stored in servo sectors 178 of a magneto-optical storage medium 110. This information typically includes track addresses and position marks used to generate a position error signal. However other types of read-only information are within the scope of the present invention.

In step 1014, the manufacturer or designer determines the dimensions of circular pits 650 (FIG. 6(b)) used to encode the information determined in step 1012. The dimensions of circular pits 650 depend on the particular embodiment of MO drive 300 using storage medium 110. The wavelength of light used by MO drive 300 and the numerical aperture of lens 530 in head 370 (FIG. 5) are used to determine the dimensions of circular pits 650, as described above in conjunction with FIG. 8.

In step 1016, the manufacturer or designer determines a pattern of circular pits 650 to represent the information to be stored in servo sectors 178. The spacing of circular pits 650 in the pattern also depends on the wavelength of light used in MO drive 300 and the numerical aperture of lens 530 in head 370, as described above in conjunction with FIG. 8. In step 1018, the manufacturer embosses the pattern of circular pits 650 on servo sectors 178 of storage medium 110. Thus the FIG. 10 method efficiently and economically encodes read-only information on storage medium 110, increasing the reliability of MO drive 300.

The invention has been explained above with reference to a preferred embodiment. Other embodiments will be apparent to those skilled in the art in light of this disclosure. For example, the present invention may readily be implemented using configurations other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for encoding read-only information comprising:
   a storage medium;
   an energy source;
   a lens for directing said energy source towards a surface of said storage medium for producing a reflection of said energy source from said surface; and
   a plurality of position marks disposed on a surface of said storage medium and having dimensions dependent on a numerical aperture of said lens so that said reflection of said energy source is not responsive to a plane of polarization of said energy source.

2. The system of claim 1, wherein said energy source comprises a light beam.

3. The system of claim 1, wherein said position marks are configured whereby an amplitude of said reflection is not affected by a direction of said plane of polarization of said energy source.

4. The system of claim 2, wherein said position marks comprise substantially circular pits.

5. The system of claim 4, wherein said dimensions of said substantially circular pits are also dependent on a wavelength of said light beam.

6. The system of claim 5, wherein said substantially circular pits are disposed on said surface of said storage medium in a plurality of rows, each of said rows being aligned with a radius of said storage medium.

7. The system of claim 6, wherein said substantially circular pits in each of said rows are disposed on said surface of said storage medium having a distance between centers of said substantially circular pits equal to approximately one-half said wavelength of said light beam divided by said numerical aperture of said lens.

8. The system of claim 7, wherein each of said substantially circular pits has a full-width-half-maximum diameter of approximately 360 nanometers, and wherein a distance between said substantially circular pits in each of said rows is approximately 120 nanometers.

9. The system of claim 6, wherein said substantially circular pits are disposed in each of said rows whereby an amplitude of said reflection of said light beam is approximately constant as said light beam is directed along one of said rows.

10. The system of claim 2, wherein each of said position marks has a depth of approximately one-quarter of a wavelength of said light beam.

11. The system of claim 2, wherein said light beam comprises a single-frequency laser beam.

12. The system of claim 11, wherein said position marks are configured whereby an amplitude of said reflection is not affected by a direction of a plane of polarization of said laser beam.

13. A method for encoding read-only information comprising the steps of:
   configuring a plurality of position marks having dimensions dependent on a numerical aperture of a lens so that a reflection of an energy source directed towards said position marks is not responsive to a plane of polarization of said energy source; and
   disposing said position marks on a storage medium.

14. The method of claim 13, wherein said energy source comprises a light beam.

15. The method of claim 13, wherein said position marks are configured whereby an amplitude of said reflection is not affected by a direction of said plane of polarization of said energy source.

16. The method of claim 14, wherein said position marks comprise substantially circular pits.

17. The method of claim 16, wherein said light beam is directed towards said substantially circular pits by the lens, and wherein said dimensions of said substantially circular pits are also dependent on a wavelength of said light beam.

18. The method of claim 17, wherein said substantially circular pits are disposed on said surface of said storage medium in a plurality of rows, each of said rows being aligned with a radius of said storage medium.

19. The method of claim 18, wherein said substantially circular pits in each of said rows are disposed on said surface of said storage medium having a distance between centers of said substantially circular pits equal to approximately one-half said wavelength of said light beam divided by said numerical aperture of said lens.

20. The method of claim 19, wherein each of said substantially circular pits has a full-width-half-maximum diameter of approximately 360 nanometers, and wherein a distance between said substantially circular pits in each of said rows is approximately 120 nanometers.

21. The method of claim 18, wherein said substantially circular pits are disposed in each of said rows whereby an amplitude of said reflection of said light beam is approximately constant as said light beam is directed along one of said rows.

22. The method of claim 14, wherein each of said position marks has a depth of approximately one-quarter of a wavelength of said light beam.

23. The method of claim 14, wherein said light beam comprises a single-frequency laser beam.

24. The method of claim 23, wherein said position marks are configured whereby an amplitude of said reflection is not affected by a direction of a plane of polarization of said laser beam.

25. A system for encoding read-only information comprising:
   a storage medium;
   a plurality of position marks disposed on a surface of said storage medium; and
   a light beam directed towards said position marks to produce a reflection of said light beam from said position marks, said position marks being disposed in a plurality of rows, each of said rows being configured whereby said reflection of said light beam is not responsive to a plane of polarization of said light beam.

26. The system of claim 25, wherein each of said rows is configured whereby an amplitude of said reflection is not affected by a direction of said plane of polarization of said light beam.

27. The system of claim 25, wherein said position marks comprise substantially circular pits.

28. The system of claim 27, further comprising a lens for directing said light beam towards said substantially circular pits in each of said rows, and wherein said substantially circular pits have dimensions dependent on a wavelength of said light beam and a numerical aperture of said lens.

29. The system of claim 28, wherein said substantially circular pits in each of said rows are disposed on said surface of said storage medium having a distance between centers of said substantially circular pits equal to approximately one-half said wavelength of said light beam divided by said numerical aperture of said lens.

30. The system of claim 25, wherein each of said position marks has a depth of approximately one-quarter of a wavelength of said light beam.

31. The system of claim 25, wherein said light beam comprises a single-frequency laser beam.

32. The system of claim 31, wherein each of said rows is configured whereby an amplitude of said reflection is not affected by a direction of a plane of polarization of said laser beam.

33. A system for encoding read-only information comprising:

a storage medium;

a plurality of marks disposed on a surface of said storage medium; and a light beam directed towards said marks to produce a reflection of said light beam, said marks being spaced at approximately an optical cutoff frequency dependent on a wavelength of said light beam whereby said reflection is insensitive to a plane of polarization of said light beam.

34. The system of claim 33, wherein said optical cutoff frequency is approximately equal to one-half said wavelength of said light beam divided by a numerical aperture of a lens that directs said light beam towards said marks.

35. The system of claim 34, wherein each of said marks is substantially circular.

36. The system of claim 35, wherein said substantially circular marks are disposed in a plurality of rows on said surface of said storage medium.

37. The system of claim 36, wherein said substantially circular marks are disposed in each of said rows whereby an amplitude of said reflection of said light beam is approximately constant as said light beam is directed along one of said rows.

* * * * *